(12) United States Patent
Prahlad et al.

(10) Patent No.: US 7,953,706 B2
(45) Date of Patent: May 31, 2011

(54) SYSTEM AND METHOD FOR STORING REDUNDANT INFORMATION

(75) Inventors: Anand Prahlad, East Brunswick, NJ (US); Parag Gokhale, Ocean, NJ (US); Rajiv Kottomtharayil, Marlboro, NJ (US); Manoj Kumar Vijayan Retnamma, Ocean City, NJ (US); Deepak R. Attarde, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 492 days.

(21) Appl. No.: 12/058,178

(22) Filed: Mar. 28, 2008

(65) Prior Publication Data

US 2008/0243957 A1 Oct. 2, 2008

Related U.S. Application Data

(63) Continuation of application No. 11/963,623, filed on Dec. 21, 2007, now Pat. No. 7,840,537.

(60) Provisional application No. 60/871,737, filed on Dec. 22, 2006, provisional application No. 61/066,150, filed on Oct. 31, 2007.

(51) Int. Cl.
  *G06F 7/00* (2006.01)
(52) U.S. Cl. ...................................................... 707/665
(58) Field of Classification Search .................. 707/204, 707/665
  See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |

(Continued)

FOREIGN PATENT DOCUMENTS

EP       0259912       3/1988

(Continued)

OTHER PUBLICATIONS

U.S. Appl. No. 12/626,839, filed Nov. 27, 2009, Klose, Michael F.

(Continued)

*Primary Examiner* — Tony Mahmoudi
*Assistant Examiner* — Jensen Hu
(74) *Attorney, Agent, or Firm* — Perkins Coie LLP

(57) ABSTRACT

A method and system for reducing storage requirements and speeding up storage operations by reducing the storage of redundant data includes receiving a request that identifies one or more data objects to which to apply a storage operation. For each data object, the storage system determines if the data object contains data that matches another data object to which the storage operation was previously applied. If the data objects do not match, then the storage system performs the storage operation in a usual manner. However, if the data objects do match, then the storage system may avoid performing the storage operation.

23 Claims, 10 Drawing Sheets

U.S. PATENT DOCUMENTS

| | | | |
|---|---|---|---|
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,704,730 B2 | 3/2004 | Moulton et al. |
| 6,757,794 B2 | 6/2004 | Cabrera et al. |
| 6,810,398 B2 | 10/2004 | Moulton |
| 6,952,758 B2 | 10/2005 | Chron et al. |
| 7,017,113 B2 | 3/2006 | Bourbakis et al. |
| 7,117,246 B2 | 10/2006 | Christenson et al. |
| 7,143,091 B2 | 11/2006 | Charnock et al. |
| 7,191,290 B1 | 3/2007 | Ackaouy et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,320,059 B1 | 1/2008 | Armangau et al. |
| 7,325,110 B2 | 1/2008 | Kubo et al. |
| 7,395,282 B1 | 7/2008 | Crescenti et al. |
| 7,444,382 B2 | 10/2008 | Malik |
| 7,444,387 B2 | 10/2008 | Douceur et al. |
| 7,478,113 B1* | 1/2009 | De Spiegeleer et al. .............. 1/1 |
| 7,487,245 B2 | 2/2009 | Douceur et al. |
| 7,496,604 B2 | 2/2009 | Sutton, Jr. et al. |
| 7,647,462 B2 | 1/2010 | Wolfgang et al. |
| 7,661,028 B2 | 2/2010 | Erofeev |
| 7,685,177 B1 | 3/2010 | Hagerstrom et al. |
| 7,685,459 B1 | 3/2010 | De Spiegeleer et al. |
| 2002/0099806 A1 | 7/2002 | Balsamo et al. |
| 2002/0107877 A1 | 8/2002 | Whiting et al. |
| 2003/0033308 A1 | 2/2003 | Patel et al. |
| 2003/0041093 A1* | 2/2003 | Yamane et al. .............. 709/201 |
| 2003/0110190 A1 | 6/2003 | Achiwa et al. |
| 2003/0182310 A1* | 9/2003 | Charnock et al. .......... 707/104.1 |
| 2004/0148306 A1 | 7/2004 | Moulton et al. |
| 2004/0250033 A1 | 12/2004 | Prahlad et al. |
| 2005/0033756 A1 | 2/2005 | Kottomtharayil et al. |
| 2005/0086443 A1 | 4/2005 | Mizuno et al. |
| 2005/0114406 A1 | 5/2005 | Borthakur et al. |
| 2005/0131900 A1 | 6/2005 | Palliyll et al. |
| 2005/0203864 A1 | 9/2005 | Schmidt et al. |
| 2006/0005048 A1 | 1/2006 | Osaki et al. |
| 2006/0010227 A1 | 1/2006 | Atluri |
| 2006/0053305 A1 | 3/2006 | Wahlert et al. |
| 2006/0224846 A1 | 10/2006 | Amarendran et al. |
| 2006/0230244 A1 | 10/2006 | Amarendran et al. |
| 2006/0242489 A1 | 10/2006 | Brockway et al. |
| 2007/0022145 A1 | 1/2007 | Kavuri |
| 2007/0118705 A1 | 5/2007 | Arakawa et al. |
| 2007/0179995 A1 | 8/2007 | Prahlad et al. |
| 2007/0198613 A1 | 8/2007 | Prahlad et al. |
| 2007/0203937 A1 | 8/2007 | Prahlad et al. |
| 2007/0255758 A1 | 11/2007 | Zheng et al. |
| 2008/0028007 A1 | 1/2008 | Ishii et al. |
| 2008/0098083 A1 | 4/2008 | Shergill et al. |
| 2008/0162320 A1 | 7/2008 | Mueller et al. |
| 2008/0162518 A1 | 7/2008 | Bollinger et al. |
| 2009/0112870 A1 | 4/2009 | Ozzie et al. |
| 2009/0132619 A1 | 5/2009 | Arakawa et al. |
| 2009/0144285 A1 | 6/2009 | Chatley et al. |
| 2009/0177719 A1 | 7/2009 | Kavuri |
| 2009/0204649 A1 | 8/2009 | Wong et al. |
| 2010/0094817 A1 | 4/2010 | Ben-Shaul et al. |
| 2010/0161554 A1 | 6/2010 | Datuashvili et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Diligent Technologies "HyperFactor," <http://www.diligent.com/products:protecTIER-1:HyperFactor-1>, Internet accessed on Dec. 5, 2008, 2 pages.

Overland Storage, "Data Deduplication," <http://www.overlandstorage.com/topics/data_deduplication.html>, Internet accessed on Dec. 5, 2008, 2 pages.

Lortu Software Development, "Kondar Technology-Deduplication," <http://www.lortu.com/en/deduplication.asp>, Internet accessed on Dec. 5, 2008, 3 pages.

Quantum Corporation, "Data De-Duplication Background: A Technical White Paper," May 2008, 13 pages.

Kornblum, Jesse, "Identifying Almost Identical Files Using Context Triggered Piecewise Hashing," www.sciencedirect.com, Digital Investigation 3S (2006), pp. S91-S97.

International Search Report and Written Opinion, International Application No. PCT/US2009/58137, Mail Date Dec. 23, 2009, 14 pages.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Jander, M., "Launching Storage-Area Net," Data Communications, US, McGraw Hill, NY, vol. 27, No. 4 (Mar. 21, 1998), pp. 64-72.

Jason Gait, "The Optical File Cabinet: A Random-Access File System For Write-Once Optical Disks," IEEE Computer, vol. 21, No. 6, pp. 11-22 (1988).

Rosenblum et al., "The Design and Implementation of a Log-Structured File System," Operating Systems Review SIGOPS, vol. 25, No. 5, New York, US, pp. 1-15 (May 1991).

U.S. Appl. No. 11/950,376, filed Dec. 4, 2007, Bunte et al.
U.S. Appl. No. 11/963,623, filed Dec. 21, 2007, Gokhale et al.
U.S. Appl. No. 12/058,317, filed Mar. 28, 2008, Prahlad et al.
U.S. Appl. No. 12/058,367, filed Mar. 28, 2008, Prahlad et al.
U.S. Appl. No. 12/145,342, filed Jun. 24, 2008, Gokhale.
U.S. Appl. No. 12/145,347, filed Jun. 24, 2008, Gokhale.
U.S. Appl. No. 12/167,933, filed Jul. 3, 2008.
U.S. Appl. No. 12/647,906, filed Dec. 28, 2009, Attarde et al.
U.S. Appl. No. 12/649,454, filed Dec. 30, 2009, Muller et al.

CommVault Systems, Inc., "Continuous Data Replicator 7.0," Product Data Sheet, 2007.

U.S. Appl. No. 12/565,576, filed Sep. 23, 2009, Kottomtharayil et al.

CommVault Systems, Inc., "Deduplication," <http://documentation.commvault.com/commvault/release_8_0_0/books_online_1/english_US/features/single_instance/single_instance.htm>, earliest known publication date: Jan. 26, 2009, 9 pages.

CommVault Systems, Inc., "Deduplication—How To," <http://documentation.commvault.com/commvault/release_8_0_0/books_online_1/english_US/features/single_instance/single_instance_how_to.htm>, earliest known publication date: Jan. 26, 2009, 7 pages.

* cited by examiner

| Hash | First Location | Ref. Count | Size | Time |
|---|---|---|---|---|
| 0xABCDEF... | \\server\c$\io.sys | 56 | 20,254 | 1/1/2000 |
| 0xFEDCBA... | \\hr\employee.pdf | 22 | 1,568,214 | 9/20/2006 |
| ... | | | | |

FIG. 9

SYSTEM AND METHOD FOR STORING REDUNDANT INFORMATION

CROSS-REFERENCE TO RELATED APPLICATIONS

This application is a continuation application of U.S. patent application Ser. No. 11/963,623, entitled "SYSTEM AND METHOD FOR STORING REDUNDANT INFORMATION," filed on Dec. 21, 2007 now U.S. Pat. No. 7,840,537, which claims the benefit of U.S. Provisional Patent Application No. 60/871,737 entitled "SYSTEM AND METHOD FOR STORING REDUNDANT INFORMATION," filed on Dec. 22, 2006, each of which is hereby incorporated by reference.

This application claims the benefit of U.S. Provisional Patent Application No. 61/066,150 entitled "SYSTEM AND METHOD FOR STORING REDUNDANT INFORMATION," and filed on Oct. 31, 2007, which is hereby incorporated by reference.

BACKGROUND

Computer systems contain large amounts of information. This information includes personal information, such as financial information, customer/client/patient contact information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, then create one or more secondary copies, such as backup files, containing the contents of the file. These secondary copies can then later be used to restore the original data should anything happen to the original data.

In corporate environments, protecting information is generally part of a routine process that is performed for many computer systems within an organization. For example, a company might back up critical computing systems related to e-commerce such as databases, file servers, web servers, and so on. The company may also protect computing systems used by each of its employees, such as those used by an accounting department, marketing department, engineering, and so forth.

Although each computer system may contain certain unique information, many systems may contain very similar information. For example, although a computing system used by a marketing employee and another computing system used by an engineering employee will generally contain unique information created by each employee in the course of their work, both computing systems will likely have the same operating system installed, with thousands of identical or similar files used by the operating system. Similarly, both computing systems will likely have at least some similar application programs installed, such as a word processor, spreadsheet, Internet browser, and so on. Both systems may also have similar corporate information. For example, each employee may have an electronic copy of an employee manual distributed by the company. Information other than files may also be identical or similar between systems. For example, user settings and preferences may have similar default values on each system and application programs may contain similar templates on each system that are stored as application-specific information. As another example, several employees may have received a copy of the same email, and the email may be stored in each employee's electronic mailbox.

As a result of the amount of redundant information in an organization, secondary copies of an organization's information are often very large and can require the purchase of expensive storage devices and storage media. The restoration of data in the event of data loss is also slowed by the large size of the secondary copies. As the size of secondary copies increase, locating and restoring information requires more actions to be taken to restore information. For example, it may be necessary to search many tapes or other media to find the correct secondary copy. The great quantity of storage media, such as tapes, may mean that some secondary storage media has been moved offsite such that it must first be retrieved before information can be recovered from it. Each of these factors increases the cost of protecting information and the time required to recover information in the event of data loss. Quick recovery of information is often critical to today's businesses, and any additional delay could affect business operations and customers' satisfaction with the business.

There is a need for a system that overcomes the above problems, as well as one that provides additional benefits.

BRIEF DESCRIPTION OF THE DRAWINGS

FIG. 9 is a table that illustrates information stored by a single instance database component, in one embodiment.

Figure 1:
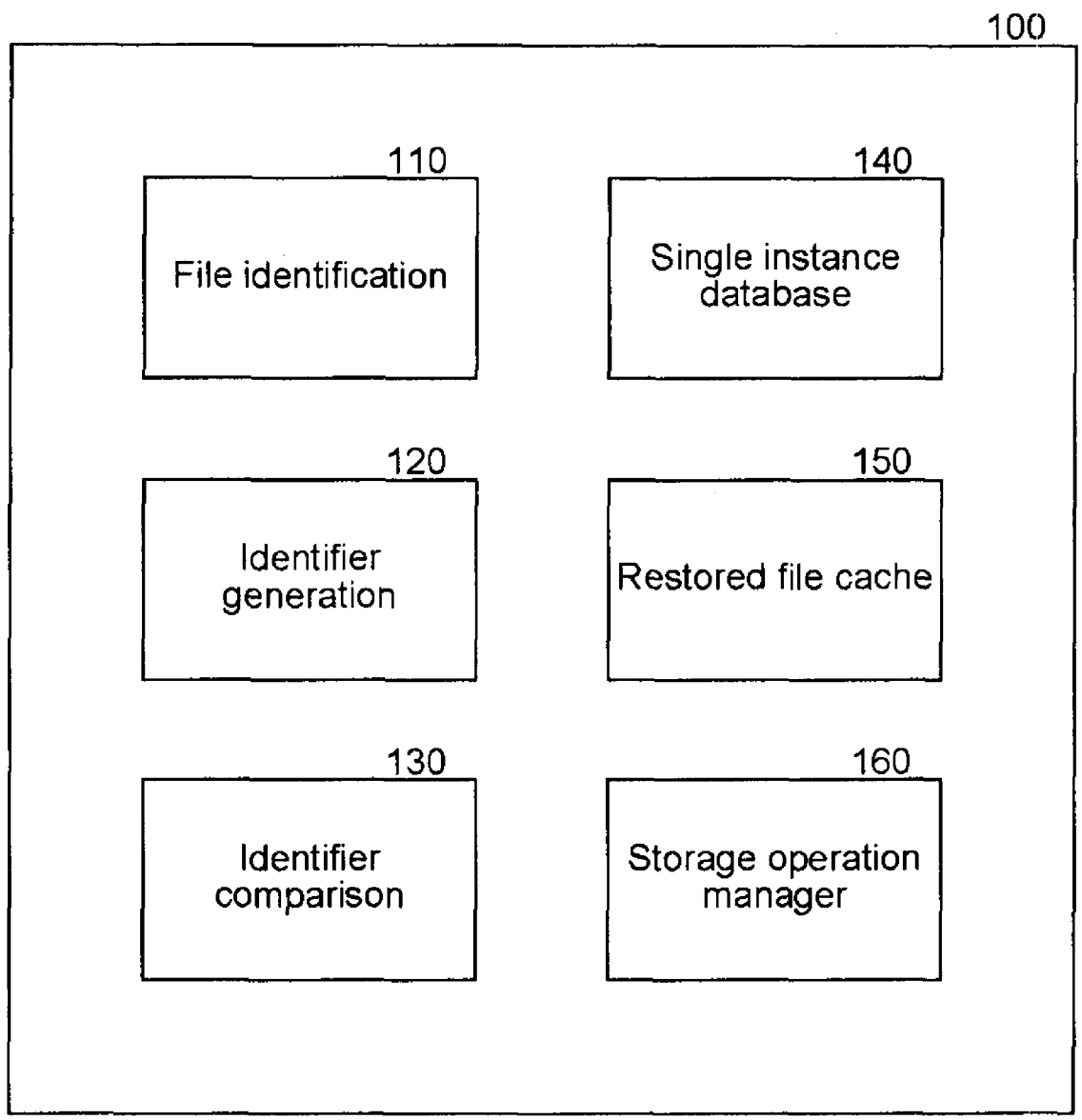
FIG. 1 is a block diagram that illustrates components of a system in one embodiment of the invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 604 is first introduced and discussed with respect to FIG. 6).

DETAILED DESCRIPTION

The headings provided herein are for convenience only and do not necessarily affect the scope or meaning of the claimed invention.

Overview

A method and system for reducing storage requirements and speeding up storage operations by reducing storage of redundant data, referred to as single instancing, first receives a request that identifies one or more data objects on which to perform a storage operation. A storage operation can include many different types of operations, such as a backup, copy, snapshot, disk image, and so on. For example, one storage operation is a backup of data, and the request may specify the location of data objects to be backed up, such as a directory of files, and a location to store backup data, such as a network file server. A data object can include many different types of data, such as files, email, application-specific data (e.g., documents, spreadsheets, databases, and so on), configuration settings, and so forth. For each data object, the storage system determines if the data object contains data that matches another data object that was the subject of a previous storage operation. For example, if the storage operation is a backup of data files, then the storage system determines if backup data from a previous backup operation already contains a particular file to be backed up by the current operation. If the data objects do not match, then the storage system performs the storage operation in a usual manner. However, if the data objects do match, then the storage system may avoid performing the storage operation. For example, in the case of a backup, the storage system may only store the files that are not already contained in backup data from a previous backup operation. For additional instances of the file, the storage system may store metadata describing the presence of the additional instances without storing the additional instances themselves. For example, if the same file, is discovered in two different directories as part of a storage operation, then the first instance of the file may be stored in total and a placeholder or pointer may be stored representing the second instance of the file rather than storing the second instance of the file itself. The data objects may comprise any type of electronic information or object that supports object-level recovery, such as files, emails, attachments, and application data. Thus, the storage system reduces the amount of storage required to perform the storage operation and saves time by reducing the amount of data for which storage operations are performed to satisfy a storage request.

Single instancing presents a number of challenges when using sequential media. Sequential media includes media such as tapes that are typically accessed (e.g., read and written) sequentially. Sequential media is contrasted with random-access media, such as disk drives, flash drives, and optical media, that can be accessed randomly. One difficulty when using sequential media is that seeking to a particular location takes longer than random-access media. For example, while a hard drive may have an access time of several milliseconds, sequential media may have an access time of several seconds to several minutes. Therefore, it is often desirable to lay out data on sequential media in a way that reduces or eliminates dependencies among the data on different parts of the media. Single instancing, on the other hand, creates dependencies between the original instance of a file and additional instances that reference the original instance of the file. Thus, the storage system provides special techniques for storing and retrieving single instance data on sequential media.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as; such in this Detailed Description section.

Determining Data Object Similarity

Various methods of determining if one data object is similar (e.g., two instances of the same data) to another data object will now be described. However, those of ordinary skill in the art will recognize that many other methods besides those described here can be used to achieve similar results.

In some embodiments, the storage system determines if two data objects are similar by performing a binary comparison. For example, a first file can be compared byte by byte with a second file. If each byte of data in each file matches, then the two files are identical and therefore similar. Otherwise, the two files do not match and are not treated as similar.

In some embodiments, the storage system determines if two data objects are similar by creating a digest or fingerprint of the data contained in each data object. For example, as storage operations are performed, the storage system may perform a hash on each file to create a digest of the file. The digest of the file can be compared with stored digests created for other files. If the digest of two files match, then the system may consider the files to be identical. Any suitable hashing algorithm can be used, such as Message Digest version 5 (MD5).

In some embodiments, the storage system may store additional information along with a data object digest. A hash algorithm is generally selected that has a low likelihood of hash collisions, which occur when two data objects containing different data have the same hash value. However, hash collisions do occur and additional information can be used to substantially reduce the likelihood of these collisions. For example, for files the system may store the file size as additional information. When two data objects are compared to determine their similarity, the digests are compared as well as the additional information. If both the digests and the additional information match are the data objects considered identical. For example, for two files if the hash value and size do not match, then the files are not considered identical even though the hash values alone may match. Some information, such as the file name for a file, may not be included in the digest so that the storage system will consider two files having the same data but different names identical. Even though the names of files or other information may differ, the hash value will be the same and the storage system can avoid storing the redundant data. The storage system can also perform other operations after hashing is complete, such as encrypting the data. By hashing the data before encryption or other operations that modify the data are performed, the storage system allows single instancing to be performed at some time later on the modified data. For example, if files are initially copied from a client system to a first copy, then hashed, and then encrypted to create a second copy, it is still possible for the storage system to single instance the second copy and remove redundant instances of data based on the pre-generated hashes without having to first decrypt the data to restore its original content.

In some embodiments, the storage system may operate specially on data objects that are similar, but not identical. For example, many computing systems in an organization may have word processors with similar document templates, but each user may have slightly modified the document templates to match that user's preferences. The storage system may compare the document templates of two users and determine which portions are the same and which portions are different. Then, the system may treat the portions that are the same as described above, avoiding redundant storage of the identical portions, while storing only the portions that are different. As another example, several users may have received an email and replied to the email. The replies may contain some new text, but much of the text may be the contents of the original message. In this example, the storage system may only store the similar text once and store the new text for each user's reply. For example, the system may break the email up into blocks, and compare blocks within the email message to determine which are similar.

Single Instancing—Auxiliary Copies

Reducing or eliminating redundant instances of data resulting from a storage operation is sometimes referred to here as "single instancing," because what would traditionally be stored as many instances of the same data is reduced to as few as one. Redundant instances may be detected and reduced at several locations or times throughout the operation of the system that will now be described. These embodiments are provided only as examples, and are not intended to be an exhaustive list of the way in which the system can be implemented.

In some embodiments, the storage system performs single instancing of data at the system containing or originally generating the data, such as a client system. For example, a client system that is the source of data that is the subject of a storage operation may receive a request from the storage system to provide a hash value of each file to be included in the storage operation. The client uses a hashing algorithm to produce a hash of the files or other data objects requested by the storage system. Alternatively, the client may generate hash values itself for each file that is stored on the client system on an ongoing or other basis. When a storage operation is requested, the storage system receives the hash values from the client and determines if it is already aware of a file with a hash value matching that of one provided by the client system. For example, the storage system may check an index of hashes received from client systems and look for matches with the hash value or values received from the client. If the storage system is already aware of a similar file or matching file, then the client system does not even need to send the redundant file to the secondary storage location or destination. Thus, the storage system may send a follow up request to the client system that specifies a list of files that are new to the storage system. Then, the client sends the full content of the specified files.

In some embodiments, the storage system performs single instancing of data at the subject system of a storage operation. In the example of a storage operation, the storage system may request that a client system send one or more files stored on the client system to a server system (e.g., a media agent). Then, the server system checks each file (e.g., by comparing a hash of the data) received from the client system to determine if an instance of the received file has already been stored on the server system. Additional instances of a received file that the storage system has already stored on the server system can be discarded, whereas new files can be stored for the first time and can be indexed on or tracked by the server system. This alternative method eliminates the resources used by the client system for computing digests or hash values, and does not require the client system to be modified from the configuration used for a traditional storage operation. However, additional network resources may be consumed by the extra copying, and the work of computing digests or hash values is shifted to the server system.

In some embodiments, the storage system performs single instancing on a copy of data created by a previously performed storage operation. For example, the storage system may copy data from a primary location to a secondary location, and then perform single instancing on the secondary copy of the data. The storage system may create many copies of data, sometimes referred to as secondary or auxiliary copies, as part of an organization's data handling plan, and single instancing may be performed at any stage of the process on any of the copies. The storage system may process the copied data, determine which files or other data objects are redundant with other data in the copy or with other copies of the data, and then save a new copy of the data that does not contain the redundant information. In this way, a backup server or other system need not be modified to reduce storage requirements, but the organization still benefits from single instancing by reducing the storage requirements later in the process, such as before backup data is stored on tape or shipped offsite for storage. As another example, the system may be configured to receive backup data created by another system and create a single instanced copy of the data that is smaller in size. For example, the system may be configured to process copies of data from popular data storage applications and reduce the size of the copies of data. For example, the data from the other system may be in a different format. The system may contain agents capable of parsing the data in its original format and processing it into a more usable format, and then single instancing the data. This allows an organization to reduce the storage requirements for data that may have been copied or backed up a long time ago.

In some embodiments, the storage system or other system performs additional operations on the data after single instancing has occurred. For example, backup data being stored offsite may be encrypted to prevent unauthorized parties from accessing the data. The data may also be compressed to further reduce its size. In this way, the storage system performs the additional operations more efficiently, because there is less data on which to perform the operation after redundant data has been reduced or eliminated.

Storing Single Instance Data

Single instance data may be stored in a variety of different ways. In some embodiments, single instance data may be stored in folders and files just like other, non-single instanced or file system data. When a first folder contains a file that is already present in another folder, the first folder may contain a reference, pointer, or path to the file, or a stub file that contains information about where the file containing the actual data can be located. For example, two folders A and B may each contain a file X. Folder A may contain the actual file X, while folder B may contain a stub of file X with file attributes or other supplemental information that indicates that the stub is a reference to the instance of file X located in folder A. The fact that the file in folder B is a stub may be transparent to an application. For example, a file system filter driver may detect the stub and provide the actual file data from folder A to any application that attempts to access the file in folder B. Thus, the storage system preserves the organization of the data, but eliminates the redundant instances of the data, thus saving storage space and time consumed performing additional storage operations on the data.

In some embodiments, the single instance of the file may contain a reference count or other count to track the number of other instances that are referring to the file. Alternatively, an index of files stored by the storage system may track the references to any particular single instanced file. In the example above, the file X in folder A may contain a reference count of two indicating that the file belongs in two locations, folder A folder B. The storage system may use the reference count to prevent the file from being deleted or otherwise made unavailable while there are still outstanding references to the file.

Single Instancing—Sequential Media

Tapes and other sequential or removable media are often used for backup and other storage operations. Sequential media present special challenges for storage systems because the drawbacks of accessing data out of sequence are often much higher than accessing the data in sequence. For example, with tape media it can be very fast to read data from the beginning of the tape, then the middle, then the end (i.e., sequentially), but much slower to read data first from the end, then the middle, then the beginning (i.e., randomly or out of sequence). Therefore, it is often a goal of storage systems to structure data stored to sequential media in such a way that the data can be accessed sequentially.

In some embodiments, the storage system prepares single instance copies of data destined for sequential media using intermediate (e.g., random access) media. For example, the storage system may perform a single instance backup to a hard drive, and then process the data stored on the hard drive to prepare it for writing to tape. The data may be structured so that the first instance of each file contains the file data and is stored earlier on the tape than redundant references of the file that reference the first instance (e.g., through a stub or pointer to the first instance). This allows any redundant instances of the file to be read after the actual instance of the file using a sequential read operation. The redundant instances may contain information needed to locate the first instance such as the offset on the current tape, or the identifier of another tape if the backup data set spans multiple tapes.

In some embodiments, the storage system uses a similar technique when restoring data. For example, the storage system may restore data first to an intermediate, random access media, such as a hard drive, where the data can be recreated in its original form, including resolving references to redundant instances of the data, before being copied to a subject system. Alternatively, the storage system may maintain the data in its single instanced form and handle requests for the data by deinstancing the data upon request. For example, the system may copy the first instance of the file to a first directory, and then when a second directory references the file the system copies the file from the first directory based on information stored in a pointer or stub describing the contents of second directory. These and other techniques for storing single instance data to sequential media are described further below with reference to the figures.

FIGURES

The details of the storage system described above will now be illustrated with reference to the figures. Unless described otherwise below, aspects of the invention may be practiced with conventional data processing systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 (or other embodiments or figures) based on the detailed description provided herein.

FIG. 1 is a block diagram that illustrates components of the system, in one embodiment. The storage system 100 contains a file identification component 110, an identifier generation component 120, an identifier comparison component 130, a single instance database component 140, a restored file cache component 150, and a storage operation manager component 160. The file identification component 110 identifies files or other data objects, such as in response to a storage operation. The file identification component 110 may retrieve additional information related to a data object, such as its size, used by the system to uniquely identify the data object. The identifier generation component 120 generates a summary, or digest, of a file or other data object that is used to determine if another data object already stored by the system matches the data object used to generate the digest. The identifier comparison component 130 performs comparisons of digests of various data objects to determine if the data objects contain similar data.

The single instance database component 140 is a data store that contains entries identifying data objects managed by the storage system 1000, and may also contain supplemental information such as a digest, path, location, reference count, or file size. The restored file cache component 150 optionally provides an intermediate location used by the system 100 during a restore operation to hold instances of files for which additional references may need to be restored. For example, during a restore operation, the storage system may restore files to the cache and then transfer the files to a subject location of the restore operation. When the storage system encounters a reference to a single instance copy of a data object, the system may consult the restored file cache component 150 or an index to determine if the data object is present in the cache before attempting to restore the data object from another location, such as a tape. The storage operation manager component 160 coordinates storage operations and invokes the other components of the storage system 100 as needed to perform requested storage operations. For example, the storage manager component 160 may include an application used by an administrator to manage the system. The storage manager component 160 may also maintain indexes of the data objects and each of the references to those data objects through the system, as well as pending operations on the data objects that are part of an organization's data management plan.

FIG. 1 and the discussion herein provides a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention may reside on a server computer, while corresponding portions reside on a client computer such as a mobile or portable device, and thus, while certain hardware platforms are described herein, aspects of the invention are equally applicable to nodes on a network.

Figure 2:
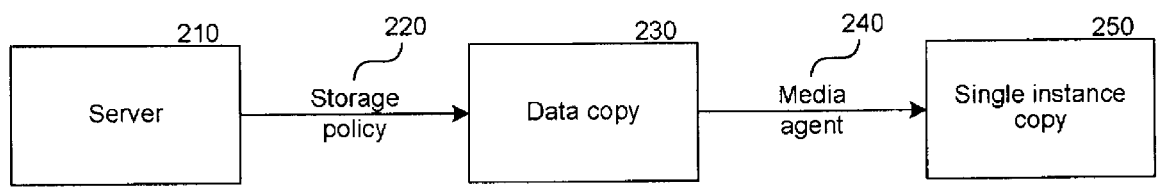
FIG. 2 is a block diagram that illustrates a flow of data during a storage operation, in one embodiment.

FIG. 2 is a block diagram that illustrates the flow of data during a storage operation, in one embodiment. Data is initially stored on a server 210 or other source of data. A storage policy 220 or other configuration information specifies a storage operation to be performed on the data. For example, the storage policy 220 may specify that the data stored on the server 210 is to be backed up daily to tape. The storage policy 220 causes the backup to occur, which creates the data copy 230. The data copy 230 may contain many redundant files or other data objects. A media agent 240 manages the data copy 230, and creates a single instance copy 250. The single instance copy 250 is a copy of source data in which the storage system has removed at least some of the redundant data objects. The media agent 240 uses the methods described herein to eliminate redundant instances of files contained in the data copy 230, and to produce the single instance copy 250. The single instance copy 250 may then be stored on tape or other media.

A media agent 240 is generally a software module that conducts data, as directed by the storage operation manager 160, between a client computer and one or more storage devices such as a tape library, a magnetic media storage device, an optical media storage device, or other storage device. The media agent 240 is communicatively coupled with and controls the storage device. For example, the media agent 240 might instruct the storage device to use a robotic arm or other means to load or eject a media cartridge, and to archive, migrate, or restore application specific data. The media agent 240 generally communicates with the storage device via a local bus such as a SCSI adaptor. In some embodiments, the storage device is communicatively coupled to the media agent 240 via a Storage Area Network ("SAN").

Each media agent 240 maintains an index cache which stores index data the system generates during backup, migration, and restore storage operations. For example, storage operations for Microsoft Exchange data generate index data. Index data provides the system with an efficient mechanism for locating user files for recovery operations. This index data is generally stored with the data backed up to the storage device, and the media agent 240 that controls the storage operation also writes an additional copy of the index data to its index cache. The data in the media agent 240 index cache is thus readily available to the system for use in storage operations and other activities without having to be first retrieved from the storage device.

A storage policy 220 is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy 220 may be stored to a media agent index, to archive media as metadata for use in restore operations or other storage operations, or to other locations or components of the system.

Figure 3:
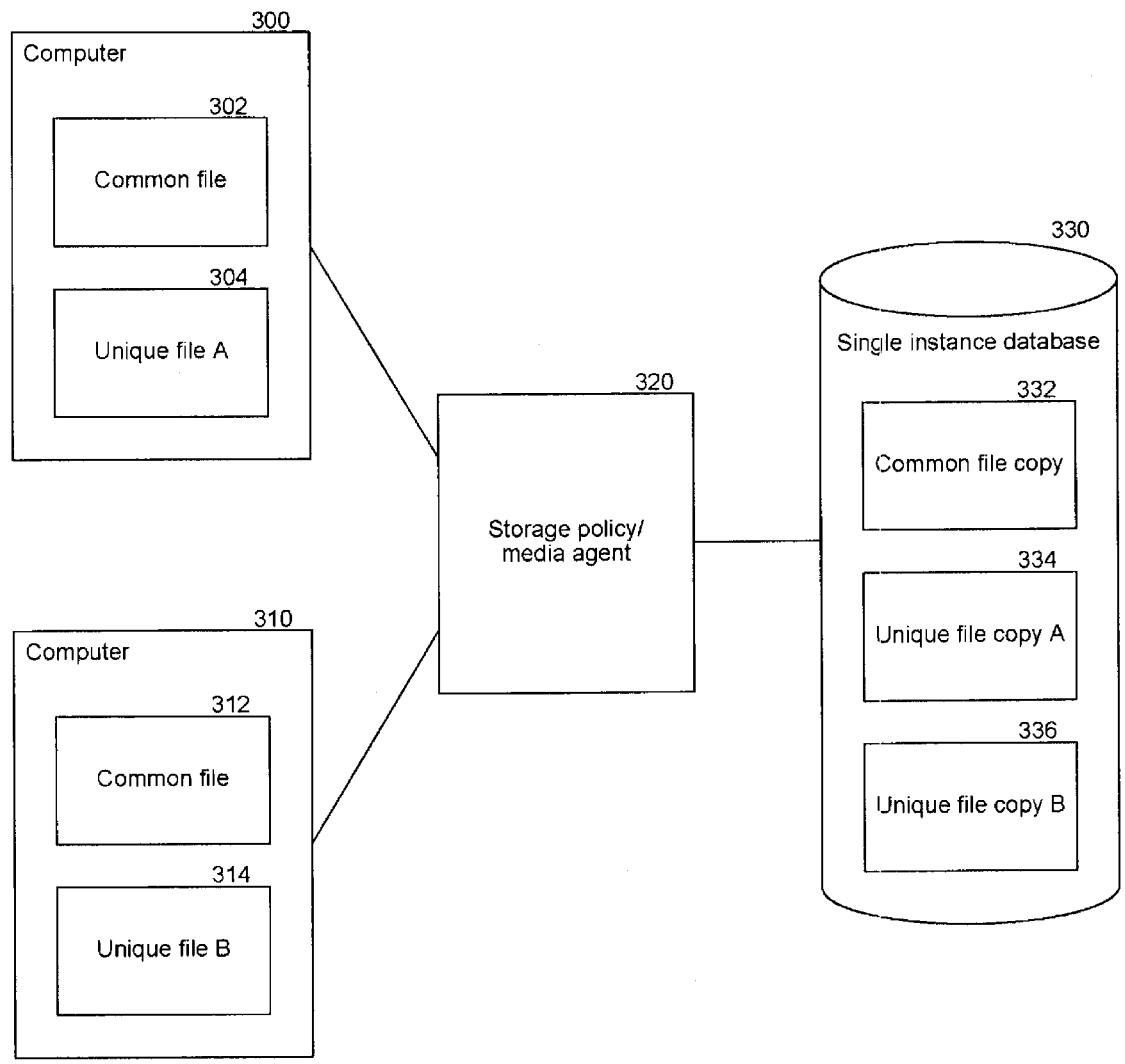
FIG. 3 is a block diagram that shows a typical arrangement of the storage system in an enterprise, in one embodiment.

FIG. 3 is a block diagram that shows a typical arrangement of the storage system in an enterprise, in one embodiment. A typical enterprise contains many computer systems, such as computers 300 and 310. A computer system 300 contains a common file 302 that is common to systems throughout the organization. For example common file 302 may be an operating system file that all of the computer systems running a particular operating system contain. The computer system 300 also contains a unique file A 304 that is unique to computer system 300. Similarly, computer system 310 contains another instance of the common file 312 and a unique file B 314 that is only stored on computer system 310. A media agent 320 manages storage operations in the enterprise described by storage policies, such as nightly backups of data stored on computer systems 300 and 310. The media agent 320 stores data in a single instance database 330 such that common files are only stored once. For example, the single instance database 330 contains a common file copy 332 that contains the same data as the instances of the common file 302 and 312 stored by computer systems 300 and 310. The single instance database 330 also contains a copy of unique file A 334 and unique file B 336.

FIGS. 4-6 and 10 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

Figure 4:
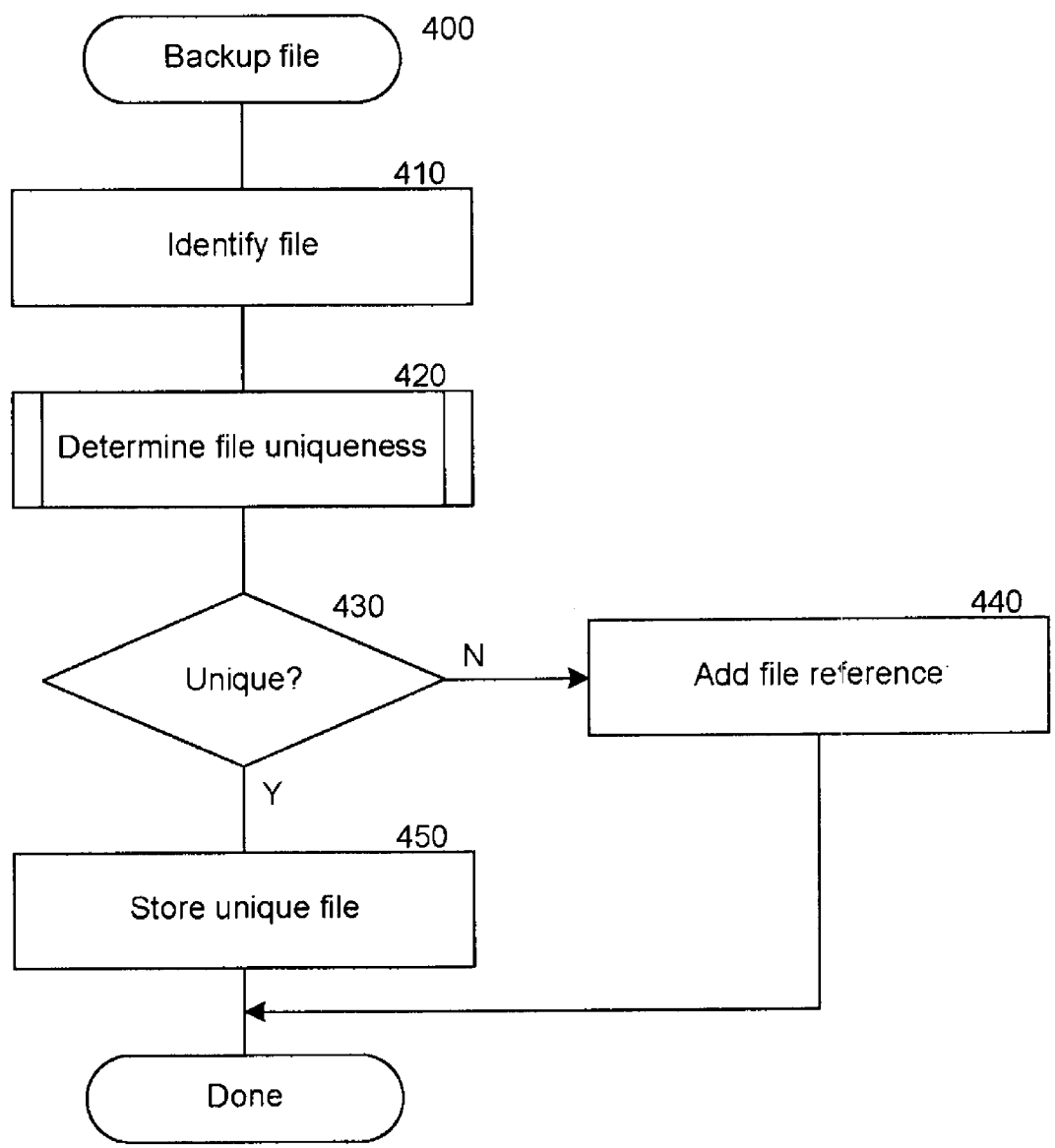
FIG. 4 is a flow diagram that illustrates processing of a storage operation manager component of the system in one embodiment.

FIG. 4 is a flow diagram that illustrates the processing of the storage manager component 160 of the system in one embodiment. The component is invoked when a storage operation that creates a copy of a file is requested. In step 410, the component identifies a file to be copied, such as based on a request to backup data. In step 420, the component determines whether the file is unique, or if the file has been copied before. For example, the component may compute a digest in the manner described herein, and compare the digest to the digests of previously copied files to determine if the file is an instance of a previously copied file. In decision step 430, if the is unique, then the component continues at step 450, else the component continues at step 440. In step 440, the component adds a reference (e.g., in an index of data managed by the system) to the already backed up instance of the file, and then completes. In step 450, the component stores the unique file. After step 450, these steps conclude.

Figure 5:
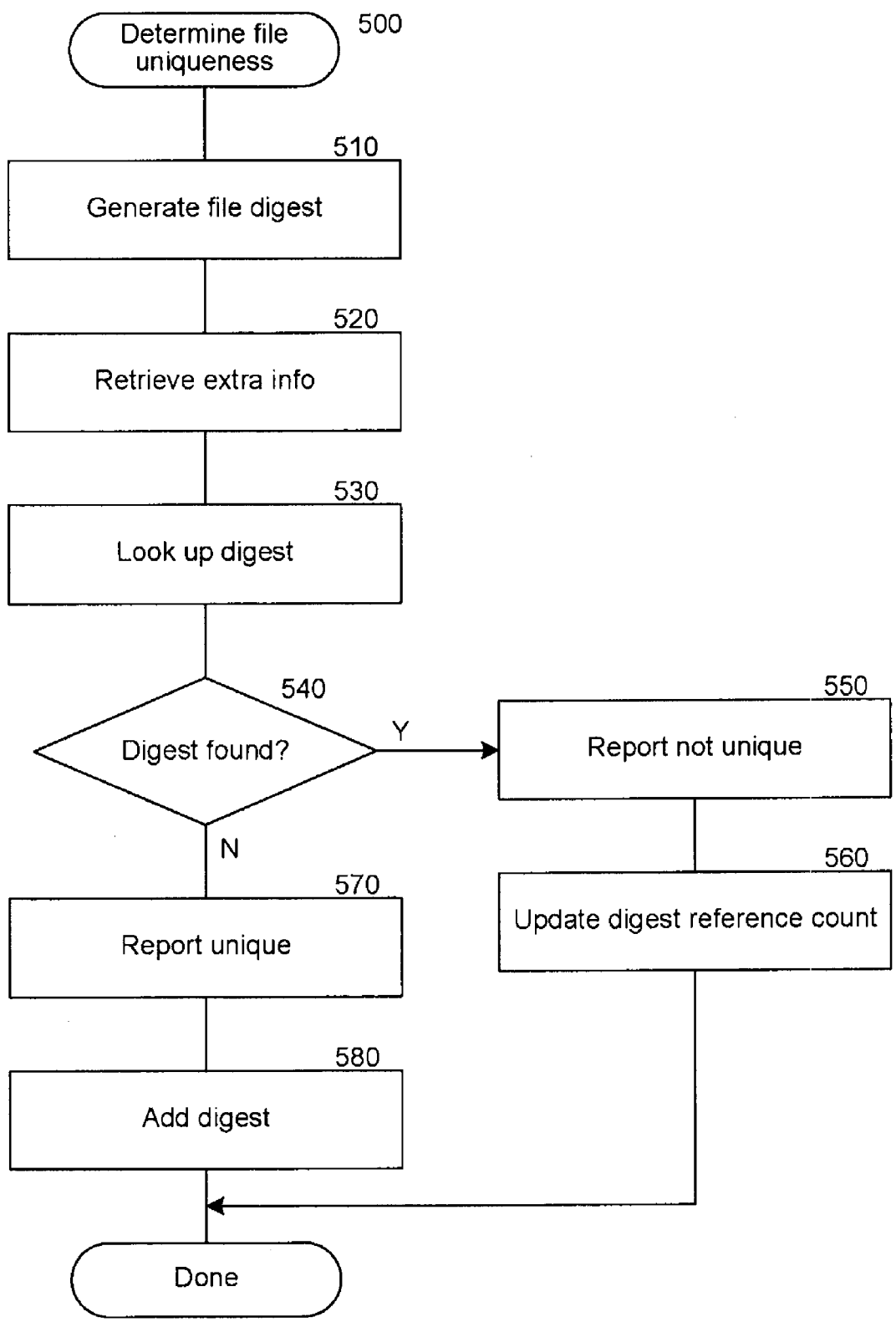
FIG. 5 is a flow diagram that illustrates processing of the system to determine whether a file is unique, in one embodiment.

FIG. 5 is a flow diagram that illustrates the processing of the system 100 to determine whether a file is unique, in one embodiment. These steps may be invoked by the storage operation component 160, such as when performing a storage operation as described in FIG. 4 or at other times. In step 510, the identifier generation component 120 generates a digest of a file that is the subject of the backup operation. In step 520, the file identification component 110 gathers (e.g., by querying the file system of a client) additional information about the file, such as the file's size, security information, or other attributes. In step 530, the identifier comparison component 130 (e.g., on the client or a media agent) determines if the digest of the file and any supplemental information matches that of any existing file tracked by the single instance database component 140. In decision step 540, if the files match, then the system 100 continues at step 550, otherwise the system 100 continues at step 570. In step 550, the system 100 reports to the entity that invoked the component that the file is not unique. In step 560, the system updates the digest reference count tracked by the single instance database component 140 and then concludes. In step 570, the system 100 reports to the entity that invoked the component that the file is unique. In step 580, the system 100 adds the file's digest and other information to the list of files tracked by the single instance database component 140. These steps then conclude.

Figure 6:
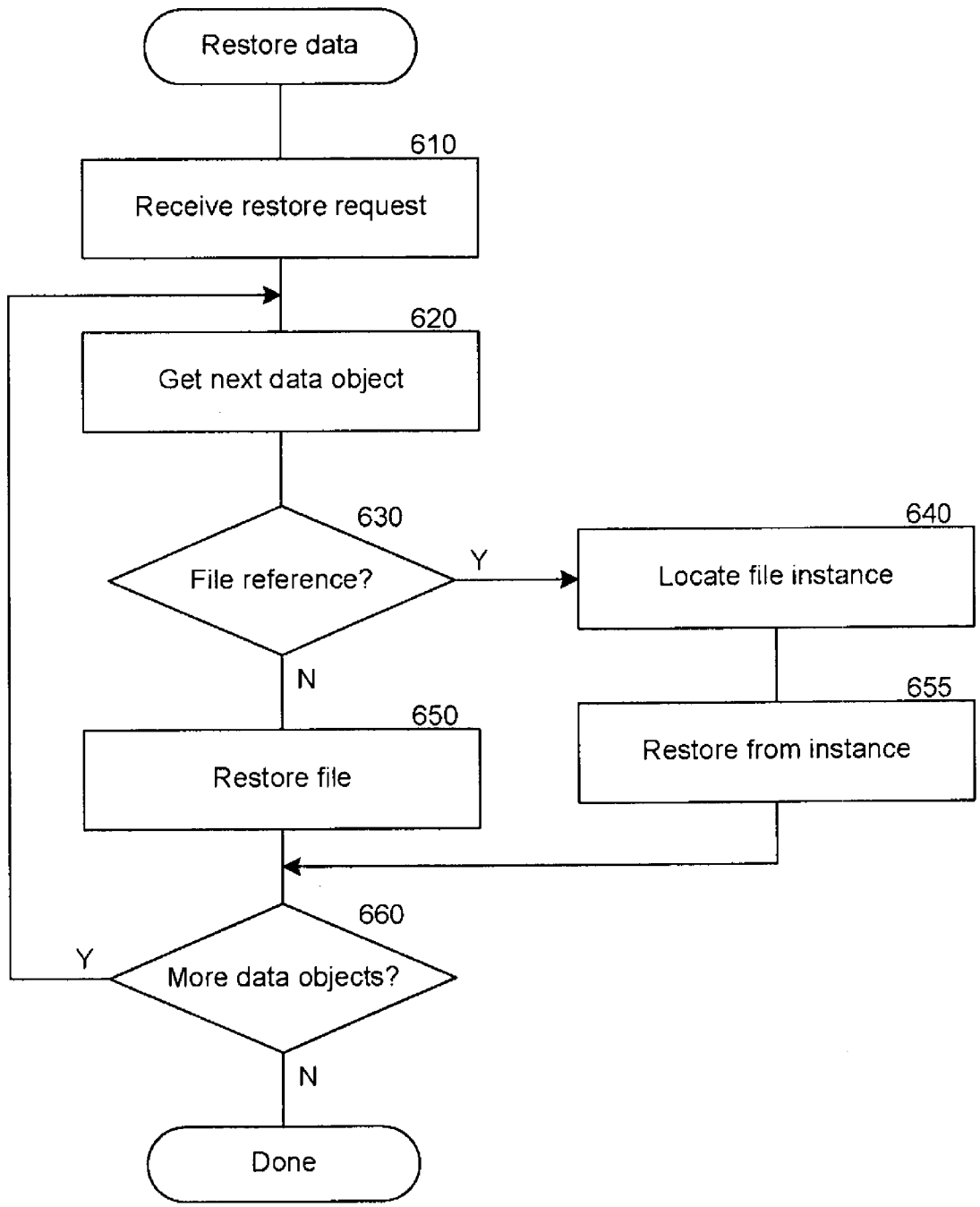
FIG. 6 is a flow diagram that illustrates processing of the storage operation component to restore data, in one embodiment.

FIG. 6 is a flow diagram that illustrates the processing of the storage operation component 160 to restore data, in one embodiment. The component is invoked when a request is received, for example, to restore data. In step 610, the component receives a request to restore data. In step 620, the component selects the next data object referred to by the request. For example, the request may identify 10 data objects, and the component selects the first data object on which to perform the following steps. Alternatively or additionally, the 10 data objects may have been written to tape in various orders, and the component may generate a plan for accessing the 10 data objects based on a determination of the layout of the data objects on the media. In decision step 630, if the selected data object is a reference to an instance of a file stored somewhere else, then the component continues at step 640, else the component continues at step 650. In step 640, the component locates the referenced instance of the file and continues to step 655. In step 655, the component restores the data object from the referenced instance of the file. In step 650, the component restores the file directly from the data object. In decision step 660, if there are more data objects referred to by the received request, then the component loops to block 620 to select the next data object on which to perform these steps, else the component completes.

Figure 7:
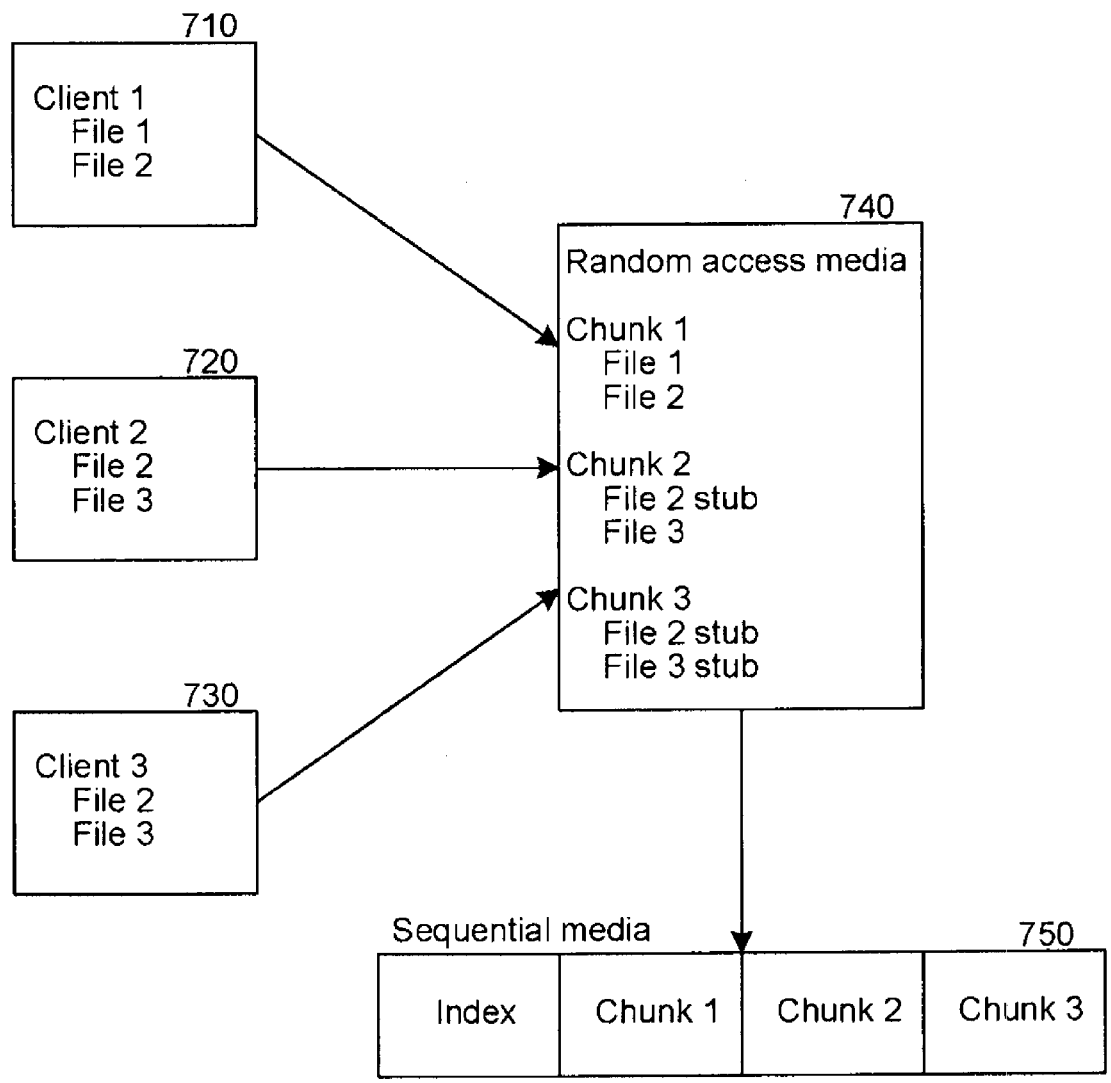
FIG. 7 illustrates the process of storing data from three clients first to single-instanced random access media and then to sequential media.

FIG. 7 illustrates the process of storing data from three clients first to single-instanced random access media and then to sequential media. In some embodiments, the system first single instances data to random-access media, such as a magnetic disk, and then copies the single instanced data to sequential media, such as a tape. The system may create each file in a data set as one or more chunks of data, for example, stored as one on more folders on random-access media. Client 1 710 stores two files, File 1 and File 2. Client 2 720 stores two files, File 2 and File 3. Client 3 730 stores two files, File 2 and File 3. The files from each client are stored in a separate chunk on the random access media 740, which creates a separate folder for each chunk. Within the folder for the first chunk is the data for File 1 and File 2 stored by Client 1 710. This is the first time that either File 1 or File 2 has been stored on the random access media 740. When client 2 stores File 2 and File 3, the media agent checks its index to determine that File 2 already exists in chunk 1. The media agent directs the data storage operation to store an actual copy of File 3 in chunk 2, because File 3 is being stored for the first time, and a stub or dummy file for File 2 in chunk 2 that contains a pointer to the actual data for File 2 stored in chunk 1. Thus, the entire data of File 2 is only stored in Chunk 1. Chunk 1 may also contain metadata associated with File 2 that includes a reference count. Each pointer to the file then increments the reference count. The reference count may be stored with each chunk or in the index. This allows the system to determine when particular files can are no longer referenced and can be pruned from the random access media to reclaim space. Each file or data object may have header information stored in a tag header that stores any reference count or pointers to other objects, as well as supplemental information such as the date the file was first stored, an expiration date after which the file can be deleted and other storage-related information. The header information can be used to rebuild the index if the index is ever lost.

When client 3 stores its copies of File 2 and File 3, the media agent determines that both files have already been stored, and two stub files are stored in the Chunk 3 folder. The first stub represents File 2 and points back to the data in Chunk 1. The second stub represents File 3 and points back to the data in Chunk 2. At some point, an administrator or scheduled process determines that the data from the random access media should be stored to sequential media. For example, this process could take place as part of a nightly data storage routine. The system stores the data for each of the chunks to the sequential media, one after the other. Optionally, the system may store index information on the sequential media that identifies which data (e.g., files) is stored in which chunk. The chunks may be large and thus span multiple sequential media, and the index may contain information about the sequential media on which it is stored as well as other sequential media that contain data for the data set.

Alternatively or additionally, the index data may remain at the media agent and be protected separately as part of a data protection process used by the media agent. It should be noted that the index data is not needed to restore data from the chunks stored on the sequential media. To the contrary, the stub information stored within each chunk is sufficient to recreate the index data from sequential media, and can serve as an additional copy for protecting the index data.

FIGS. 8-9 illustrate some of the data structures used by the system. While the term "field" and "record" are used herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

Figure 8A:
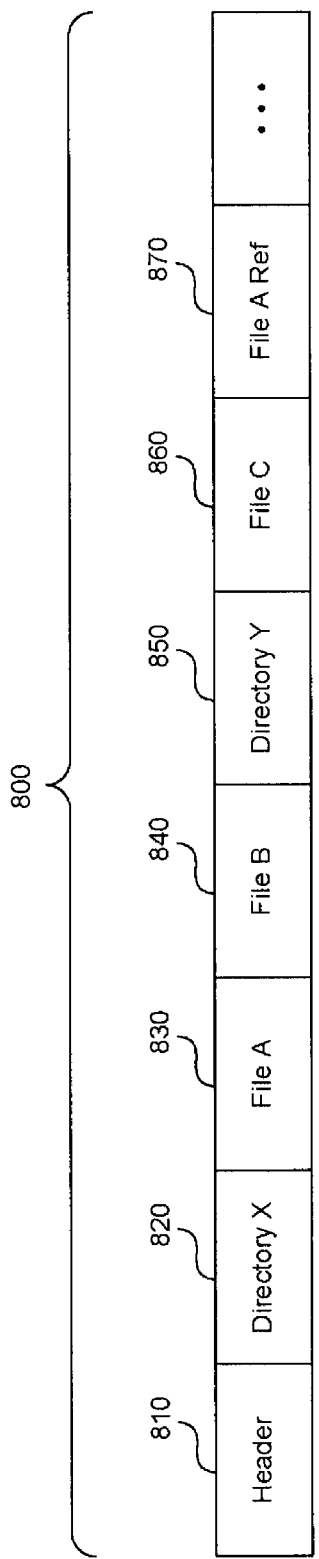
FIG. 8A is a data structure that illustrates a layout of storage data on a tape or other sequential media, in one embodiment.

FIG. 8A is a data structure that illustrates the layout of storage data on a tape or other media, in one embodiment. The data structure 800 contains a series of entries that are smaller data structures, described in more detail in FIG. 8B. The data structure 800 contains header information 810 that identifies the data that follows and the media. For example, the header information 810 may store a serial number or other identifier that uniquely identifies the tape so that other tapes (or database or index entries) can reference data stored on the tape, and an index of the data stored on the tape. The index may contain information about the original file system structure where the data stored on the tape was located. The entry 820 signals the start of data from a directory X. Data following the entry 820 is placed in directory X when it is restored. The entry 830 contains information about a file A. The entry may contain header information describing details about the data, such as the size of the data, followed by the data itself. The entry 840 similarly contains information about a file B. The entry 850 signals the start of data from a directory Y. The entry 860 contains information about file. The entry 870 is the second occurrence of file A, which is stored in both directory X and directory Y. The entry 870 stores a reference to the data of file A which is stored in entry 830, rather than a second copy of the data.

Figure 8B:
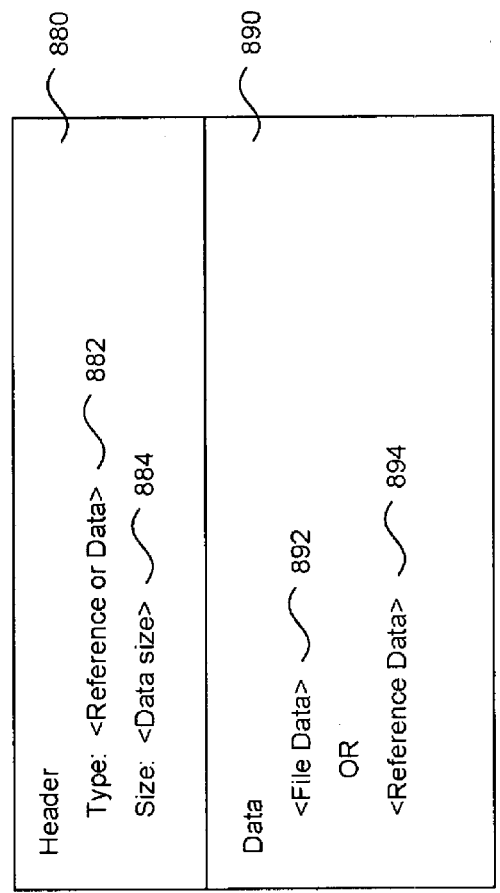
FIG. 8B is a data structure that illustrates a type of data stored in each entry of FIG. 8A, in one embodiment.

FIG. 8B is a data structure that illustrates the type of data stored in each file and directory entry of FIG. 8A, in one embodiment. The entry contains a header 880 and data 890. The header 880 contains a type 882 and a size 884. The type 882 indicates the type of entry and what kind of information is stored in the data 890, such as directory information, data, or a reference to data. The size 884 is just one type of additional information that may be contained in the header 880. For example, the header 880 may contain access control information, times when the data was last accessed or modified, and so on. The header 880 may contain additional data useful for making determinations about the data 890 that follows the header 880. If the type 882 indicates that the entry contains file data, then the data 890 contains the actual file data 892. If the type 882 indicates that the entry is a reference to data, then the data 890 contains reference data 894, such as an offset to the actual file data in an earlier location of the media or other media (e.g., in a multiple tape backup set).

FIG. 9 is a table that illustrates the information stored by the single instance database component 140, in one embodiment. The table 900 contains a hash column 910, a first location column 920, a reference count column 930, a size column 940, and a time column 950. The hash column 910 contains a digest value computed on a file tracked by the system, such as an MD5 hash. The first location column 920 contains an address that can be used to access the file data where it is actually located. For example, the address may be a network path or a URL that specifies a location of a file. The reference count column 930 indicates how many different instances or references to the data have been reported to the single instance database component 140. Alternatively or additionally, the reference count column 930 may contain a list of locations where the different instances are located. The size column 940 and time column 950 specify additional data that may be used in conjunction with the hash value 910 to uniquely identify a file or other data object, such as the file's size or last modified time. The table contains a first entry 960 with a hexadecimal hash value, a location of "\\server\c$\io.sys" that is a network path specifying a common operating system file, a reference count of 56, a size of 20,254 bytes, and a time of Jan. 1, 2000. The table also contains a second entry 970 with a hexadecimal hash value, a location of "\\hr\employee.pdf" that may be an employee handbook, a reference count of 22, a size of 1,568,214 bytes, and a time of Sep. 20, 2006.

Figure 10:
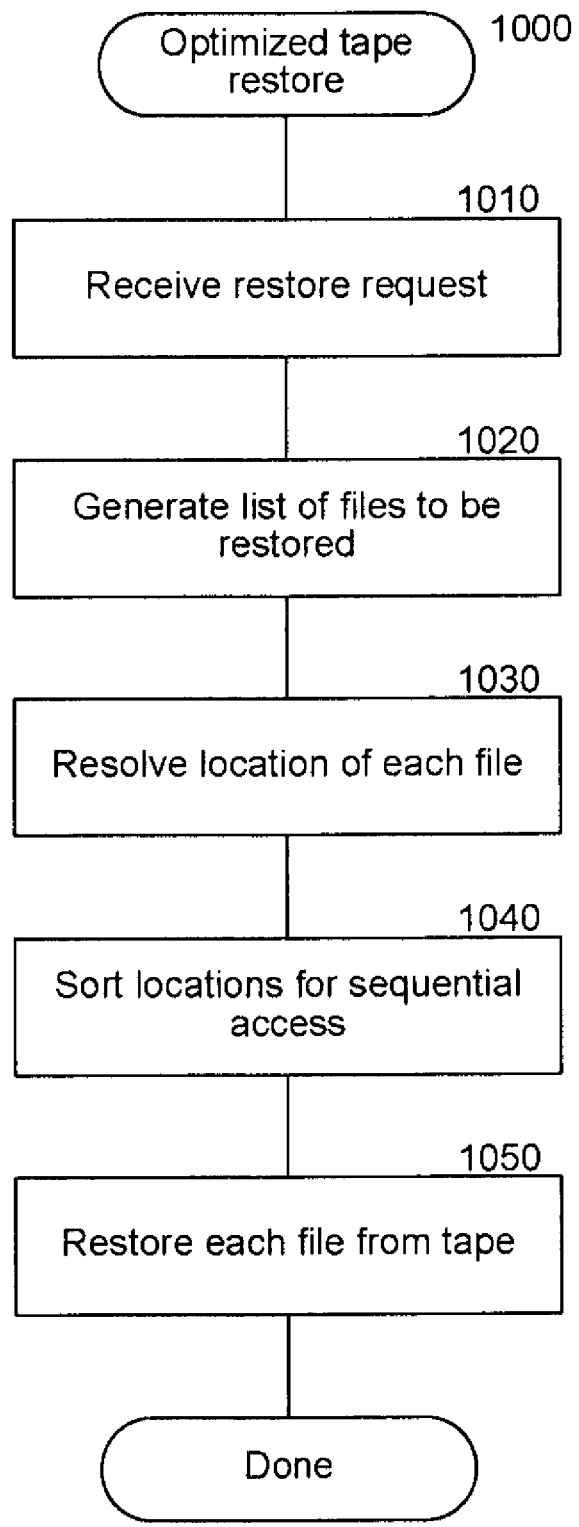
FIG. 10 is a flow diagram that illustrates processing of the storage operation component to restore date from sequential media, in one embodiment.

FIG. 10 is a flow diagram that illustrates the processing of the storage operation component 160 to restore data from sequential media, in one embodiment. In step 1010, the component receives a request to restore data. For example, the request may indicate a single file or a computer whose data is to be restored from a tape backup. In step 1020, the component generates a list of files to be restored. In step 1030, the component resolves the location of each file. For example, if the media is tape, then the location may be a tape identifier within a set of tapes and an offset within a particular tape to the file. In the example given above, this step may identify the chunk of data associated with the computer whose data is to be restored. The chunk may contain one or more stub files rather than the actual data requested, and an additional step may be performed (not shown) to resolve any pointers within the chunk to other chunks that contain the actual data. In step 1040, the locations are sorted based on their storage location on the sequential media for sequential access. For example, data that is at the beginning of the tape will be retrieved before data at the end of the tape. Sequential access provides superior access times for sequential media. In step 1050, the component restores each file from the sequential media.

In some embodiments, the process described in FIG. 10 can operate in two different modes depending on whether index data is available in addition to the data stored on sequential media. For example, the media agent that originally stored the data to the sequential media may be available with index information about the stored data. In the first mode, the index data is used to lay out a plan for accessing the data stored on the sequentially media as described in step 1040. Thus, the index data provides an optimization whereby the actual data to be restored can be accessed directly without retrieving stub data if data is readily available elsewhere in the system. In the second mode, the system has only the information about what files or other data are stored in each chunk, determines which chunks to restore, and copies the data from each chunk to a random access media file cache. Then, the system accesses each chunk of data to determine whether the chunks contain stub data. For any stubs, the system returns to the sequential media to retrieve the actual data referenced by the stub. This method is less efficient in terms of the additional seeking of the sequential media, but requires less external infrastructure for restoring the requested data. Each mode may be preferred in different situations. For example, the first mode may be preferred when data is being restored in its original environment where the media agent and other infrastructure are available for making the restore more efficient, but the second mode may be preferred when data is being restored in a new environment that does not contain all of the infrastructure available when the data was originally stored.

As described above, in some embodiments restored data is cached on random access media, and the system may check the cache before restoring any particular item from sequential media. This allows the system to save accesses to sequential media which may be slower than random access media or cause more seeking of the sequential media based on the current position of the sequential media. The lifetime of sequential media may depend on the number of seeks that occur, so saving these accesses by first accessing the cache can have reliability benefits in addition to any speed benefits.

Because the format of data stored on sequential media is type and hardware component independent, the system can single instance data sets across heterogeneous storage media. For example, the system can single instance data across different storage media (tapes, disks, and so on) or file systems (Windows, UNIX, and so on). The system can then create archive copies of data without data redundancies using heterogeneous media. Additionally, the system can then restore and provide data to users across heterogeneous systems, because the system does not depend on the applications or file systems that created the data. For example, data originally created in a UNIX environment may be stored as an archive file that is independent of typical UNIX data types. Years later, the system may receive a request to recover this data from a Windows-based device. Being data type independent, the systems is able to retrieve the file (in the archive file format), and recreate the file as a Windows based file for recovery within the Windows environment. Similarly, the system can also recover files created by different environment versions (such as recovering a Windows 95 file for a Window 2003 system).

CONCLUSION

From the foregoing, it will be appreciated that specific embodiments of the storage system have been described herein for purposes of illustration, but that various modifications may be made without deviating from the spirit and scope of the invention. For example, although backup operations have been described, the system may be used to reduce many types of redundant storage operations. As one example, the storage system may be employed by an Internet proxy server to reduce downloading of redundant files over the Internet by tracking a digest of each downloaded file and the location of a downloaded instance of the file behind the proxy server such that subsequent requests for the file can be serviced from the previously downloaded instance without accessing the file over the Internet. Similarly, the storage system could be used by a file system to reduce storage space by storing a single copy of data placed in multiple locations throughout the file system. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method in a source computer for reducing redundant storage of a data object, the method comprising:
   receiving at the source computer a first request from a server computer to perform a storage operation on multiple data objects;
   processing at the source computer the data objects specified by the first request to produce a hash, a size, and security information of each data object, wherein the hash of each data object provides an identifier of the data object, and wherein the identifier, the size, and the security information is compared with identifiers, sizes, and security information of other data objects to determine if the data objects match;
   sending from the source computer in response to the first request the hash, the size, and the security information of each data object produced by the source computer; and
   receiving at the source computer a second request from the server computer to send each data object for which the hash, the size and the security information sent does not identify a data object previously processed by the server computer and not to send each data object for which the hash, the size and the security information sent identifies a data object previously processed by the server computer,
   wherein, for every data object, the server computer utilizes the hash, the size, and the security information to determine whether the server computer previously processed the data object,
   wherein the likelihood of collisions, which occur when two data objects containing different data have the same hash, is reduced.

2. The method of claim 1 wherein the processing comprises detecting that the data object has changed and computing a new hash of the data object.

3. The method of claim 1 wherein receiving the first request comprises receiving a request to create a single instanced copy of the data object by copying those data objects that differ from data objects already copied and not copying those data objects that are the same as data objects already copied.

4. The method of claim 1 wherein receiving the first request comprises receiving a request to perform a storage operation from a storage manager that manages copying files from multiple source computer systems to one or more storage servers.

5. The method of claim 1 wherein the hash is computed using a SHA hashing algorithm, and wherein the server determines whether the data object is an instance of a previously processed data object by comparing the hash values.

6. The method of claim 1 wherein the second request includes a request to send a reference for each data object for which the hash sent identifies a data object previously processed by the server computer.

7. The method of claim 1 wherein the processing at the source computer of the data object to produce a hash of the data object is performed before the first request is received to spread out the resource load of responding the first request.

8. A system for reducing redundant copies of files in a storage environment, the system comprising:
- a hash receiving component configured to receive digest values, file sizes, and security information from client computer systems, wherein the digest values provide a summary of one or more files stored on the client computer systems, wherein the digest values are computed before a request to perform a data storage operation on the one or more files is received;
- a hash indexing component configured to maintain an index of digest values, file sizes, and security information for files managed by the system;
- a hash comparison component configured to compare received digest values, file sizes, and security information from a client computer with digest values, file sizes, and security information maintained by the index; and
- a storage operation component configured to perform storage operations based on the result of the comparison of the digest values,
- wherein the hash comparison component compares a received digest value, a file size, and security information with an index digest value, a file size, and security information to determine whether a file stored on a client computer is an instance of a file tracked within the index,
- wherein each comparison performed by the hash comparison component utilizes the digest value, the file size, and the security information,
- wherein the hash comparison component determines that a file stored on a client computer is an instance of a file tracked within the index if the received digest value, file size, and security information match the index digest value, file size, and security information, and
- wherein the hash comparison component determines that a file stored on a client computer is not an instance of a file tracked within the index if the received digest value matches the index digest value but the received file size does not match the index file size or the received security information does not match the index security information,
- wherein the likelihood of collisions, which occur when two files containing different data have the same digest value, is reduced, and
- wherein the storage operation component stores data based at least in part on the result of the comparison of the digest values.

9. The system of claim 8 wherein the storage operation component performs a copy operation and wherein when the digest value, file size, and security information for a file to be copied matches a digest value, file size, and security information in the index, the copy operation only creates a reference to the file.

10. The system of claim 8 wherein the hash receiving component precomputes the digest values as each file is modified on the client computer systems.

11. The system of claim 8 wherein the hash indexing component receives the digest values produced by a client computer system when the hash comparison component indicates that a particular file does not match any file within the index.

12. The system of claim 8 wherein the hash indexing component maintains an index of digest values for files stored by at least one of a server managed by the system, a tape media, a client computer system, and an offsite storage location.

13. A non-transitory computer-readable storage medium containing instructions for controlling a computer system to reduce redundant data, by a method comprising:
- receiving a list of files from a client computer, wherein the list contains information for each file for determining if other instances of the file are stored within the system, wherein the information comprises at least a hash value, a file size, and security information;
- comparing the list of files and the hash values, file sizes, and security information received with an index of files stored by the system, wherein the index contains hash values, file sizes, and security information for the first instance of each of the files stored by the system, wherein the comparison utilizes the hash value, file size, and security information for each file in the list;
- for each file in the list of files for which the hash value, the file size, and the security information of the file matches a hash value, a file size, and security information in the index, storing a reference to the file at a destination location; and
- for each file in the list of files for which the hash value, the file size, and the security information of the file does not match any hash value, file size, and security information in the index, storing the file at the destination location and updating the index,
- wherein the likelihood of collisions, which occur when two files containing different data have the same digest value, is reduced.

14. The non-transitory computer-readable storage medium of claim 13 wherein updating the index comprises adding the hash value of the file and information describing the destination location where the file can be located to the index.

15. The non-transitory computer-readable storage medium of claim 13 wherein receiving a list of files from a client computer comprises receiving a list of files that have changed after a specified event.

16. The non-transitory computer-readable storage medium of claim 13 including storing the files at the destination location on sequential media.

17. The non-transitory computer-readable storage medium of claim 13 wherein receiving a list of files comprises receiving hash values for portions of each file and wherein comparing the list of files and the hash values received with an index of files stored by the system comprises comparing hash values for portions of each file with hash values for portions of the files stored by the system to determine if at least part of two files match.

18. The non-transitory computer-readable storage medium of claim 13 wherein storing a reference to the file at a destination location comprises determining that the file is stored on sequential media and storing an identifier of the sequential media and offset within the sequential media to the file.

19. The system of claim 8, wherein a reference count of the number of instances of a file is stored with the index or with a stored instance of the file.

20. The system of claim 8, further comprising a sequential media drive configured to accept one or more sequential media, and wherein the storage operation component is further configured to:

store files on which storage operations have been performed on the one or more sequential media; and store the index of digest values, file sizes, and security information with the files on the one or more sequential media.

21. The system of claim 8, further comprising a storage device, and wherein the storage operation component is further configured to:

store files on which storage operations have been performed on the storage device; and store the index of digest values, file sizes, and security information with the files on the storage device.

22. The non-transitory computer-readable storage medium of claim 13, wherein each file stored at the destination location has associated header information that includes:

a reference count of the number of identical files;

the date the file was first stored; and an expiration date after which the file can be deleted.

23. The non-transitory computer-readable storage medium of claim 13, wherein each item stored at the destination location has associated header information that includes an indication of the type of the item, either file or reference.

* * * * *

UNITED STATES PATENT AND TRADEMARK OFFICE
CERTIFICATE OF CORRECTION

| | |
|---|---|
| PATENT NO. | : 7,953,706 B2 |
| APPLICATION NO. | : 12/058178 |
| DATED | : May 31, 2011 |
| INVENTOR(S) | : Anand Prahlad et al. |

It is certified that error appears in the above-identified patent and that said Letters Patent is hereby corrected as shown below:

In column 7, line 5, after "folder A" insert -- and --.

In column 8, line 21, delete "1000," and insert -- 100, --, therefor.

In column 13, line 3, delete "file." and insert -- file C. --, therefor.

Signed and Sealed this
Ninth Day of August, 2011

David J. Kappos
*Director of the United States Patent and Trademark Office*